US006340168B1

(12) United States Patent
Woleen

(10) Patent No.: US 6,340,168 B1
(45) Date of Patent: Jan. 22, 2002

(54) CONVERTIBLE CHAIR AND WALKER ASSEMBLY

(75) Inventor: Norman Woleen, Parma, OH (US)

(73) Assignee: Doris W. Alexander, Arlington, TX (US); part interest ( * ) Notice: Subject to any disclaimer, the term of this patent is extended or adjusted under 35 U.S.C. 154(b) by 0 days.

(21) Appl. No.: 09/648,229

(22) Filed: Aug. 25, 2000

(51) Int. Cl.[7] ........................... B62B 7/12; B62D 39/60; A45B 5/00; A47B 85/04

(52) U.S. Cl. ....................... 280/643; 280/648; 280/650; 280/33.996; 297/93; 297/123; 135/66

(58) Field of Search ................................ 280/643, 648, 280/642, 650, 647, 87.051, 47.39, 33.996; 135/66, 65, 74, 85; 297/123, 93, 283.2

(56) References Cited

U.S. PATENT DOCUMENTS 3,336,039 A * 8/1967 Chute et al. ................ 280/643
3,704,025 A * 11/1972 Cerveny et al. ............ 280/643
4,561,692 A * 12/1985 Yestadt et al. ................ 297/93
4,643,211 A 2/1987 Morris et al.
5,060,967 A 10/1991 Hulterstrum
5,161,811 A * 11/1992 Cheng ..................... 280/47.18
5,451,193 A * 9/1995 Pickard ................... 280/304.1
D365,785 S 1/1996 Sawyer
5,603,517 A 2/1997 Lorman
5,605,345 A 2/1997 Erfurth et al.
5,647,602 A * 7/1997 Nevin ................... 280/87.021
5,692,766 A * 12/1997 Wheeler ..................... 280/643
5,716,063 A * 2/1998 Doyle et al. ............. 280/87.05
5,772,234 A 6/1998 Luo
5,887,887 A * 3/1999 Keuning ..................... 280/641
6,092,822 A * 7/2000 Salmon ................... 280/304.1
6,161,860 A * 12/2000 Corneau ..................... 280/642

* cited by examiner

*Primary Examiner*—Lanna Mai
*Assistant Examiner*—Jeffrey J. Restifo

(57) ABSTRACT

A convertible chair and walker assembly for providing additional support for persons with limited mobility. The convertible chair and walker assembly includes a frame assembly, a plurality of wheels coupled to the frame assembly adapted for facilitating the movement of the frame assembly and a seat assembly pivotally coupled to the frame assembly which is adapted to being selectively positioned with respect to the frame assembly in multiple positions including an adult seat position, a child seat position, a walking position, and a tray position.

19 Claims, 5 Drawing Sheets

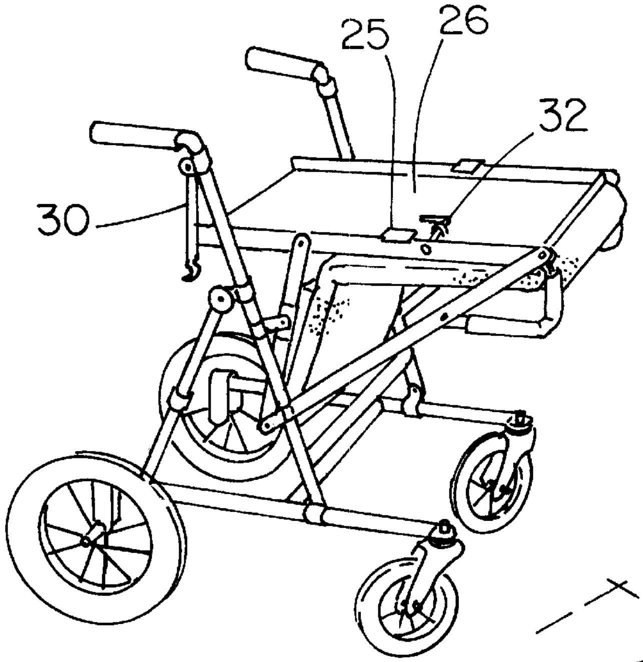
FIG. 3
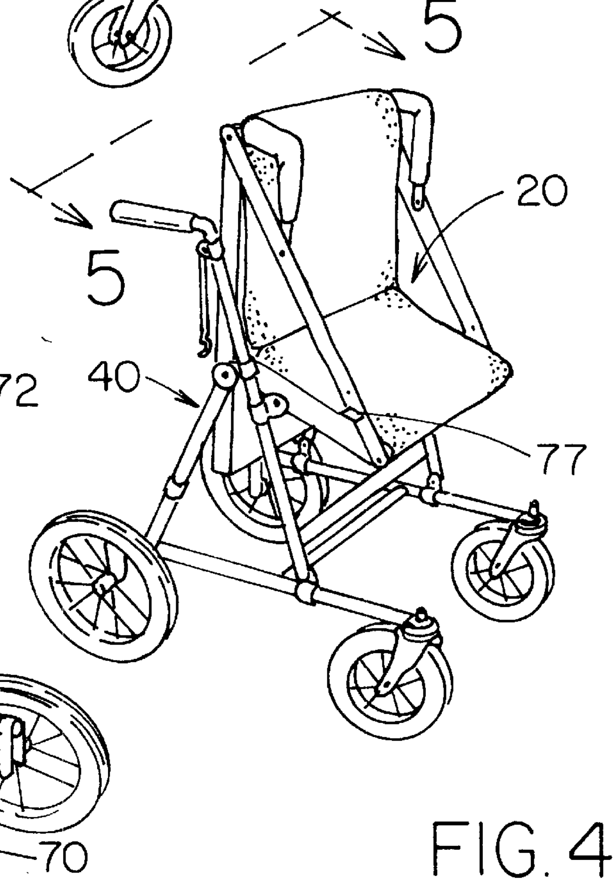
FIG. 4
FIG.5
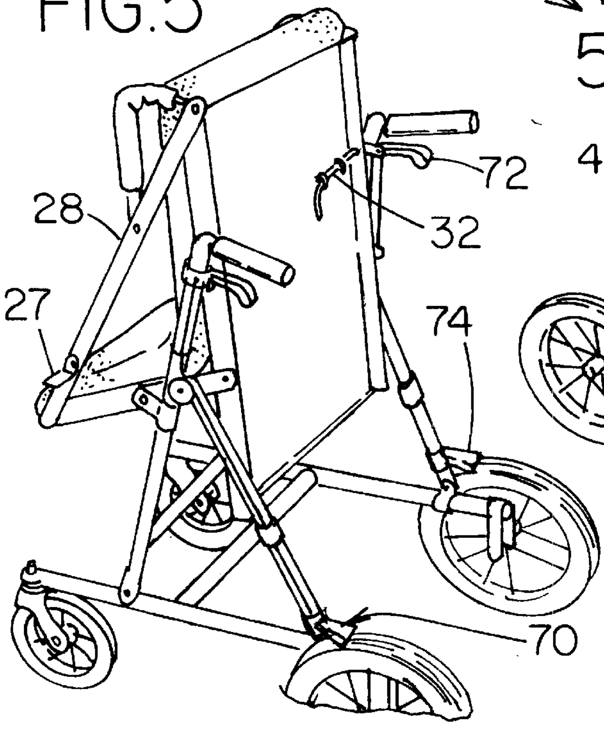

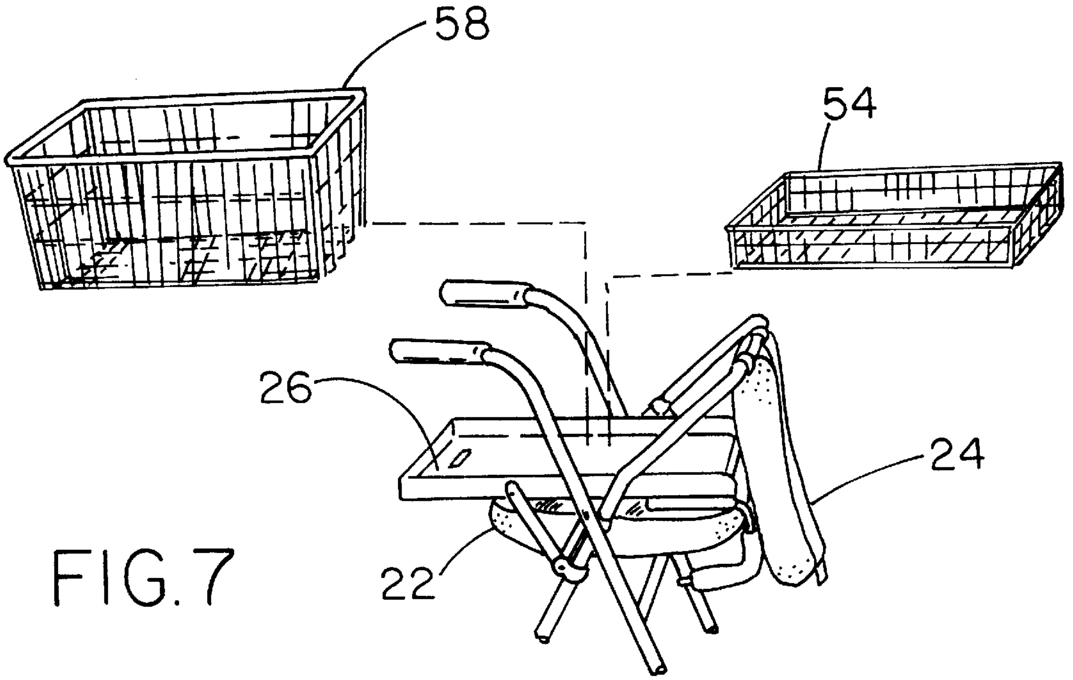
FIG. 7
FIG. 6
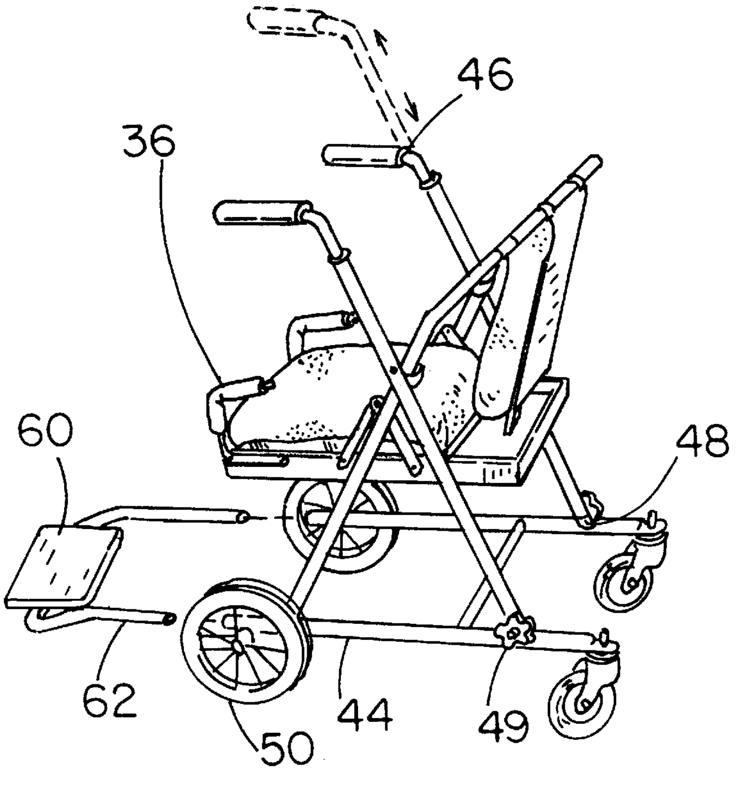

CONVERTIBLE CHAIR AND WALKER ASSEMBLY

BACKGROUND OF THE INVENTION

1. Field of the Invention

The present invention relates to configuring frame and more particularly pertains to a new convertible chair and walker assembly for providing additional support for persons with limited mobility.

2. Description of the Prior Art

The use of configuring frame is known in the prior art. More specifically, configuring frame heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,772,234; U.S. Pat. No. 5,060,967; U.S. Pat. No. Des. 365,785; U.S. Pat. No. 5,605,345; U.S. Pat. No. 4,643,211; and U.S. Pat. No. 5,603,517.

While these devices fulfill their respective, particular objectives and requirements, the aforementioned patents do not disclose a new convertible chair and walker assembly. The inventive device includes a frame assembly, a plurality of wheels coupled to the frame assembly adapted for facilitating the movement of the frame assembly and a seat assembly pivotally coupled to the frame assembly which is adapted to being selectively positioned with respect to the frame assembly in multiple positions including an adult seat position, a child seat position, a walking position, and a tray position.

In these respects, the convertible chair and walker assembly according to the present invention substantially departs from the conventional concepts and designs of the prior art, and in so doing provides an apparatus primarily developed for the purpose of providing additional support for persons with limited mobility.

SUMMARY OF THE INVENTION

In view of the foregoing disadvantages inherent in the known types of configuring frame now present in the prior art, the present invention provides a new convertible chair and walker assembly construction wherein the same can be utilized for providing additional support for persons with limited mobility.

The general purpose of the present invention, which will be described subsequently in greater detail, is to provide a new convertible chair and walker assembly apparatus and method which has many of the advantages of the configuring frame mentioned heretofore and many novel features that result in a new convertible chair and walker assembly which is not anticipated, rendered obvious, suggested, or even implied by any of the prior art configuring frame, either alone or in any combination thereof.

To attain this, the present invention generally comprises a frame assembly, a plurality of wheels coupled to the frame assembly adapted for facilitating the movement of the frame assembly and a seat assembly pivotally coupled to the frame assembly which is adapted to being selectively positioned with respect to the frame assembly in multiple positions including an adult seat position, a child seat position, a walking position, and a tray position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new convertible chair and walker assembly apparatus and method which has many of the advantages of the configuring frame mentioned heretofore and many novel features that result in a new convertible chair and walker assembly which is not anticipated, rendered obvious, suggested, or even implied by any of the prior art configuring frame, either alone or in any combination thereof.

It is another object of the present invention to provide a new convertible chair and walker assembly which may be easily and efficiently manufactured and marketed.

It is a further object of the present invention to provide a new convertible chair and walker assembly which is of a durable and reliable construction.

An even further object of the present invention is to provide a new convertible chair and walker assembly which is susceptible of a low cost of manufacture with regard to both materials and labor, and which accordingly is then susceptible of low prices of sale to the consuming public, thereby making such convertible chair and walker assembly economically available to the buying public.

Still yet another object of the present invention is to provide a new convertible chair and walker assembly which provides in the apparatuses and methods of the prior art some of the advantages thereof, while simultaneously overcoming some of the disadvantages normally associated therewith.

Still another object of the present invention is to provide a new convertible chair and walker assembly for providing additional support for persons with limited mobility.

Yet another object of the present invention is to provide a new convertible chair and walker assembly which includes a frame assembly, a plurality of wheels coupled to the frame assembly adapted for facilitating the movement of the frame assembly and a seat assembly pivotally coupled to the frame assembly which is adapted to being selectively positioned with respect to the frame assembly in multiple positions including an adult seat position, a child seat position, a walking position, and a tray position.

Still yet another object of the present invention is to provide a new convertible chair and walker assembly that is of medium weight and provides substantial support for the user while being capable of folding for transport or storage.

Even still another object of the present invention is to provide a new convertible chair and walker assembly that accommodates a variety of everyday needs including shopping and transporting small children.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention in the tray position.

FIG. 4 is a schematic perspective view of the present invention in the walking position.

FIG. 5 is a schematic perspective rear view of the present invention taken along line 5—5 of FIG. 4.

FIG. 6 is a schematic perspective view of an alternate embodiment of the present invention.

FIG. 7 is a detail view of the tray portion and baskets of and alternate embodiment of the present invention.

DESCRIPTION OF THE PREFERRED EMBODIMENT

Figure 1:
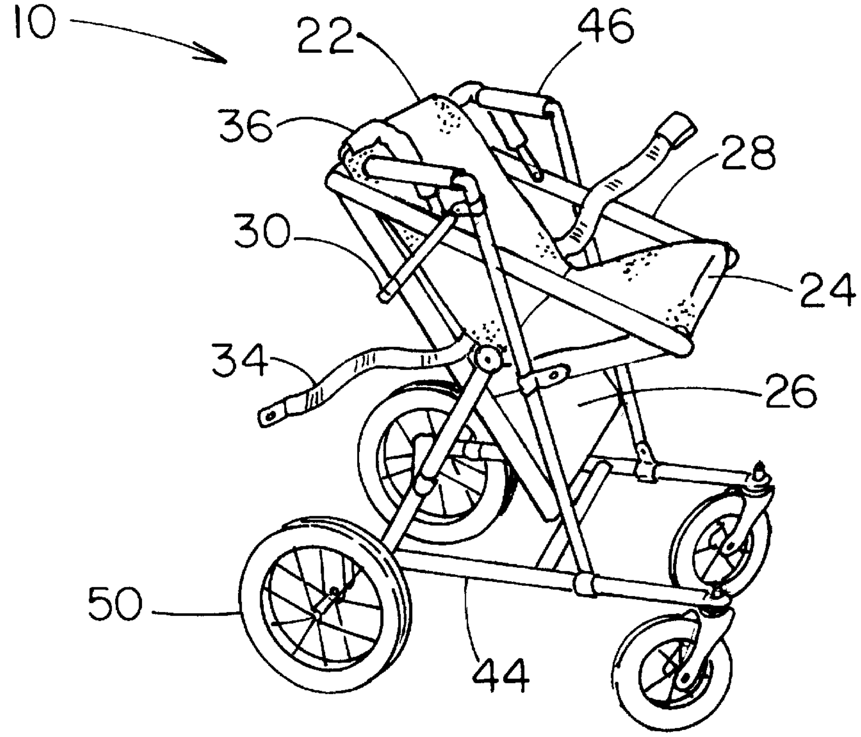
FIG. 1 is a schematic perspective view of a new convertible chair and walker assembly according to the present invention.
Figure 2:
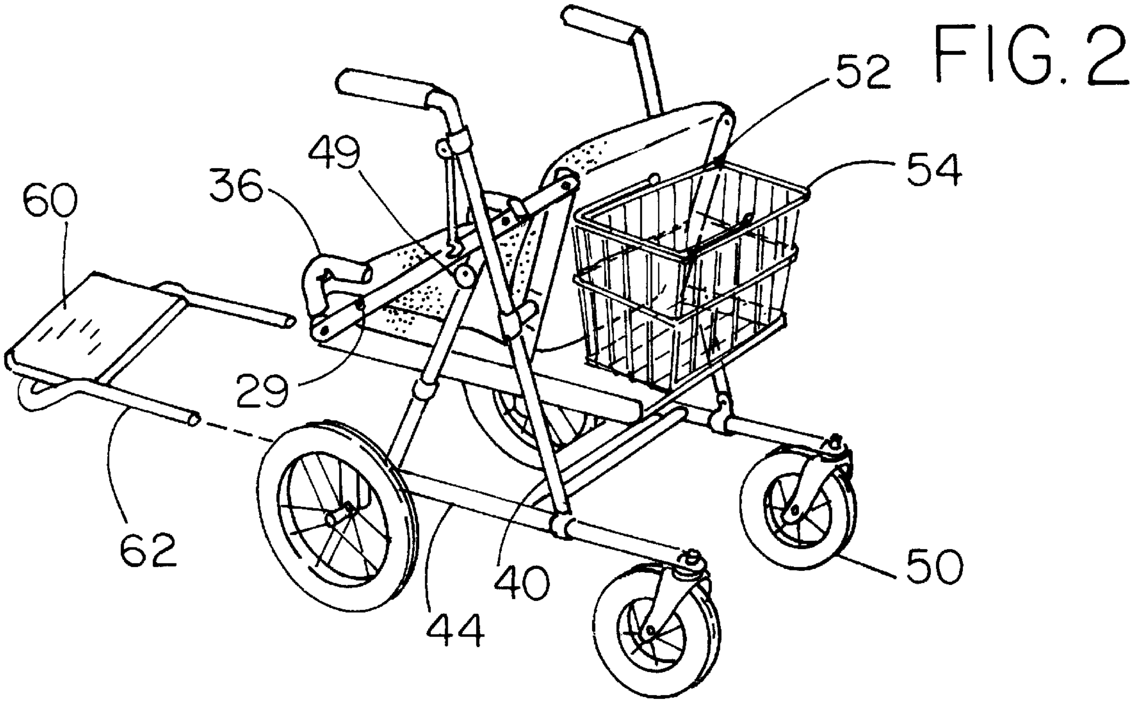
FIG. 2 is a schematic perspective rear view of the present invention.
Figure 9:
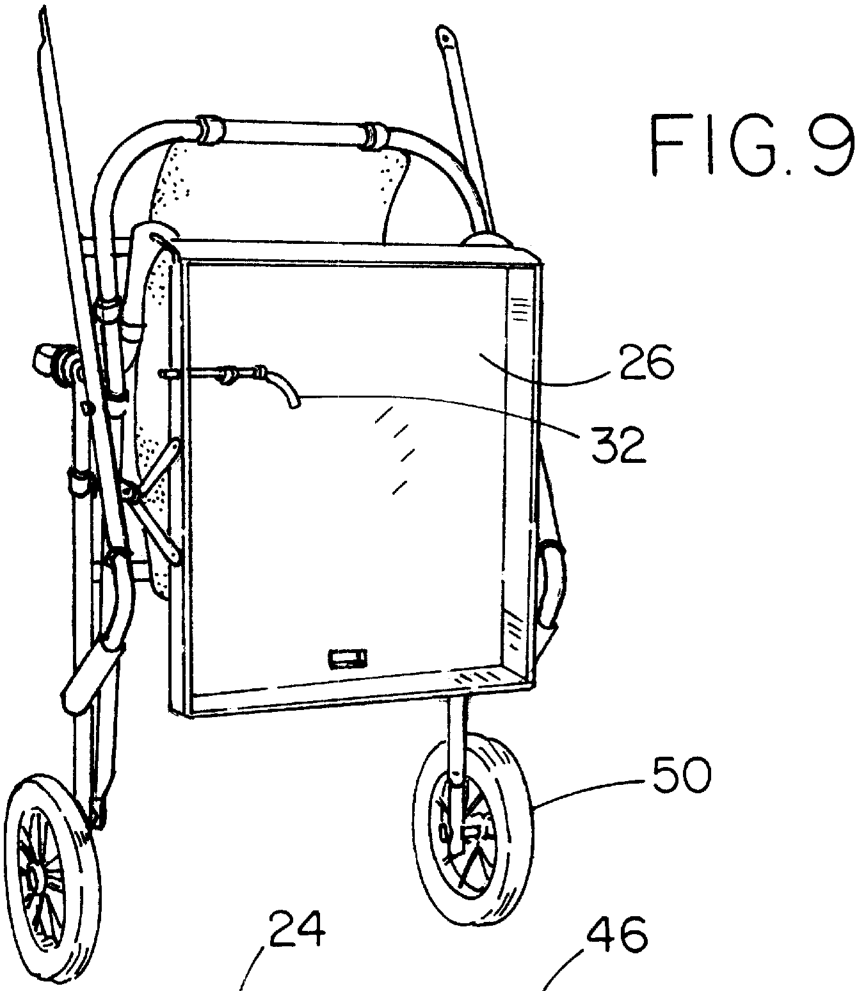
FIG. 9 is a detail view of an alternate the present invention in the folded condition.
Figure 8:
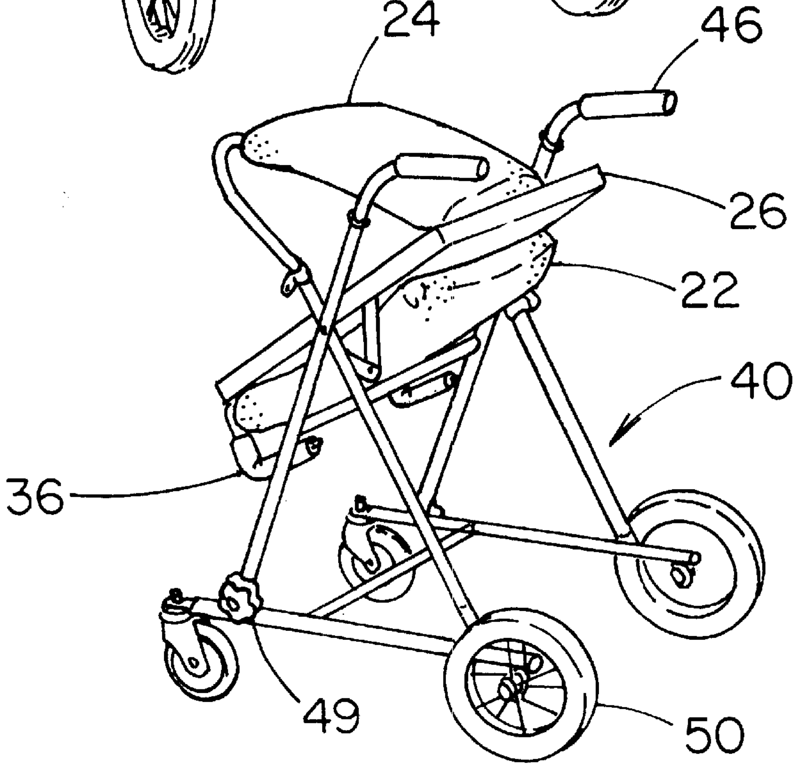
FIG. 8 is a perspective view of and alternate embodiment of the present invention.
Figure 10:
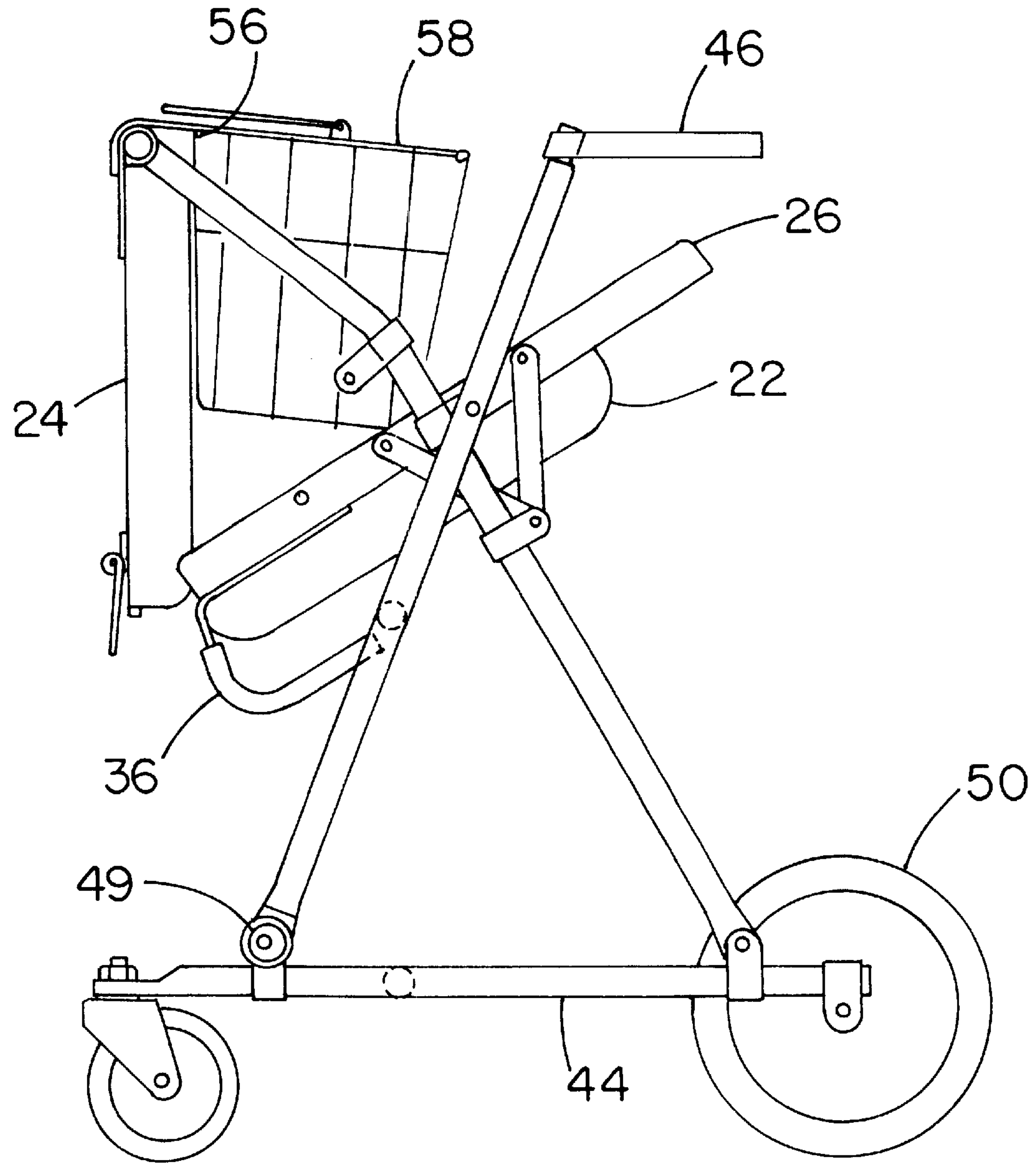
FIG. 10 is a side view of an alternate embodiment of the present invention.

With reference now to the drawings, and in particular to FIGS. 1 through 10 thereof, a new convertible chair and walker assembly embodying the principles and concepts of the present invention and generally designated by the reference numeral 10 will be described.

As best illustrated in FIGS. 1 through 10, the convertible chair and walker assembly 10 generally comprises a frame assembly 40, a plurality of wheels 50, a seat assembly 20, a first basket 54, a second basket 58, a foot rest assembly 60, a hand brake assembly 70, a first plurality of hooks 52 and a second plurality of hooks 56.

The seat assembly 20 comprises a seat portion 22, a back portion 24, a tray portion 26, a support member 28, an extension portion 30, a tray locking member 32, a pair of straps 34, and a pair of fixed handles 36. The tray portion 26, the seat portion 22, and the back portion 24 each have a length dimension such that the length of the seat portion 22 is substantially two-thirds of the length of the tray portion 26 and the length of the back portion 24 is substantially two-thirds the length of the seat portion 22. The seat portion 22 is coupled to the tray portion 26 such that the bottom surface of the seat portion 22 and the bottom portion of the tray portion 26 are substantially parallel and adjacent. The seat portion 22 is positioned relative to the tray portion 26 in such a manner that the front edge of the seat portion 22 and the leading edge of the tray portion 26 are aligned as to be substantially flush. The back portion 24 is positioned in such a manner that the bottom edge of the back portion 24 and the back edge of the seat portion 22 are substantially adjacent. This positioning of the back portion 24 relative to the tray portion 26 allows approximately one-third of the bottom surface of the tray portion 26 to remain unobstructed. The seat portion 22 and the back portion 24 are substantially perpendicular.

The support member 28 has a first end and a second end. The first end is coupled to the side of the tray portion 26 adjacent to the leading edge of the tray portion 26. The second end of the support member 28 is coupled to the side of the back portion 24 adjacent to the top edge of the back portion 24. The seat portion 22, back portion 24, and support member 28 are in a triangular relationship when viewed from the side.

The seat assembly 20 is pivotally coupled to the frame assembly 40. The seat assembly 20 may be pivoted into four stationary positions with respect to the frame assembly 40: an adult seat position, a child seat position, a walking position, and a tray position.

The support member 28 has a protrusion 29 used to engage a locking slot 31 on an extension member 30. When the seat assembly 20 is pivoted into position such that both the seat portion 22 and the back portion 24 are substantially upward from a supporting surface such as the ground, the convertible chair walker assembly 10 is in the child seat position. With the seat assembly 20 positioned in the child seat position, the extension portion 30 can be positioned such that the protrusion 29 on the support member 28 aligns with and extends through the locking slot 31 of the extension portion 30. This maintains the position of the seat assembly 20 with respect to the frame assembly 40.

The support member 28 has a support stop 27. The support stop 27 rests against the frame assembly 40 when the seat assembly 20 has been pivoted such that the top surface of the tray portion 26 is substantially parallel to a supporting surface such as the ground, and is facing substantially upward from the supporting surface. When the seat assembly 20 is positioned such that the top surface of the tray portion 26 is facing upwardly from a supporting surface, the convertible chair and walker assembly 10 is in the tray position.

The tray portion 26 has a tray locking member 32. When the seat assembly 20 is pivoted with respect to the frame assembly 40 such that the tray portion 26 is substantially perpendicular and the seat portion 22 is facing the forward direction with respect to the convertible chair and walker assembly 10, the assembly 20 is in the walking position. The tray locking member 32 comprises a pin. The pin aligns with an aperture 42 in the frame assembly 40 when the seat assembly 20 is pivoted into the walking position relative to the frame assembly 40. The tray locking member 40 is for selectively engaging the seat assembly 20 to the frame assembly 20 such that the position of the seat assembly 20 to the frame assembly 40 is fixed.

The tray portion 26 has a tray support stop 25. When the seat assembly 20 is pivoted with respect to the frame assembly 40 such that the tray portion 26 is substantially parallel to the supporting surface and the top surface of the tray portion 26 is facing downward with respect to the supporting surface, the convertible chair and walker assembly 10 is in the adult seat position. The adult seat position is defined by the seat 22 facing upwards thus the seat 22 is designed for supporting a person sitting in the seat 22. The tray support stop 25 of the tray portion 26 rests against the frame assembly 40 such that the seat assembly 20 is in a stationary position with respect to the frame assembly 40.

The plurality of wheels 50 is coupled to the frame assembly 40 thus the plurality of wheels 50 is designed for facilitating moving of the frame assembly 40 on a supporting surface.

The first plurality of hooks 52 coupled to an outer face of a back portion 24 of the seat assembly 20. The first basket 54 can be coupled to the first plurality of hooks 52 when the seat assembly 20 is in the adult seat position.

The foot rest assembly 60 is slidably engageable to the frame assembly 40 such that the foot rest assembly 60 is designed for supporting feet of a user seated on the seat 22 when the seat assembly 20 is in the adult seat or upright position.

The frame assembly 40 includes a pair of lower side members 44.

The foot rest assembly 60 includes a pair of connection arms 62. Each of the connection arms 62 is slidably insertable into an associated one of the lower side members 44.

The seat assembly 20 includes a pair of straps 34. The straps 34 are engageable to each other such that the straps 34 are designed for selectively securing a user to the seat 20.

A distal end of each of the straps 34 includes an associated portion of hook and loop fastener. The portions of hook and loop fastener are complimentary to each other thus the distal ends are selectively engageable to each other.

The frame assembly 40 includes a pair of telescopic handles 46 for facilitating moving of the frame assembly 40 on the supporting surface.

The hand brake assembly 70 includes a brake handle 72 coupled to one of the telescopic handles 46. The hand brake assembly 70 includes a brake member 74 coupled to the frame assembly 40 for engaging one of the wheels 50 when the brake handle 72 is actuated by a user thus the one of the wheels 50 is prevented from rotating.

The pair of fixed handles 36 are coupled to the seat 22 proximate a distal edge of the seat 22. Each of the fixed handles 36 is positioned on an associated side of the seat 22 such that each the fixed handle 36 is designed for grasping by a respective hand of a user during getting into and out of the seat assembly 20.

The frame assembly 40 is selectively collapsible for facilitating storage of the convertible chair and walker assembly 10 during periods of non-use. The frame assembly 40 includes at least one transport release 48. The transport release 48 includes a transport release knob 49. The transport release 48 selectively maintains the positioning of the frame assembly members with respect to one another. The transport release 48 allows the frame assembly members to selectively slide with respect to each other facilitating the folding of the convertible chair and walker assembly 10 when not in use.

The tray locking member 32 is extendably coupled to the bottom surface of the seat 22. The tray locking member 32 is extendable to engage an aperture 42 in the frame assembly 40 for holding the bottom surface in a generally vertical position.

The second plurality of hooks 56 is coupled to the surface of the tray portion 26. The second basket 58 is engageable to the second plurality of hooks 56 for holding the second basket 58 when the surface of the tray portion 26 is in the generally vertical position.

In use, the user pivots the seat assembly to the desired position. If the user desires the child seat position the user then positions the extension portion such that the protrusion on the back portion aligns with and extends through the locking slot on the extension portion, thus locking the seat assembly into position with respect to the frame assembly. If the user desires the walking position then the user positions the tray locking member such that it extends through the aperture in the frame assembly thus locking the seat assembly into position with respect to the frame assembly. If the user desires either the adult seat (upright) position or the tray position, the user simple pivots the seat assembly until the appropriate stop engages the frame assembly, thus holding the seat assembly in a static position with respect to the frame assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible chair and walker assembly comprising:

a frame assembly;

a plurality of wheels coupled to said frame assembly whereby said frame assembly is adapted for facilitating moving of said frame assembly on a supporting surface;

a seat assembly pivotally coupled to said frame assembly, said seat assembly having a seat and a back portion, said seat having a generally planar bottom surface;

said seat assembly being pivotable between an upright position and an inverted position, said upright position being defined by said seat facing upwards whereby said seat is adapted for supporting a person sitting in said seat, said inverted position being defined by said seat facing downwardly such that said bottom surface faces up whereby said frame assembly is usable as a walker and said bottom surface having a tray portion is adapted for supporting objects placed on of said bottom surface.

2. The convertible chair and walker assembly of claim 1, further comprising:

a basket; and a plurality of hooks coupled to an outer face of a back portion of said seat assembly, said basket being couplable to said hooks when said seat assembly is in said upright position.

3. The convertible chair and walker assembly of claim 1, further comprising:

a foot rest assembly slidably engageable to said frame assembly such that said foot rest assembly is adapted for supporting feet of a user seated on said seat when said seat assembly is in said upright position.

4. The convertible chair and walker assembly of claim 1, further comprising:

said seat assembly including a pair of straps, said straps being engageable to each other such that said straps are adapted for selectively securing a user to said seat.

5. The convertible chair and walker assembly of claim 4, further comprising:

a distal end of each of said straps having an associated portion of hook and loop fastener, said portions of hook and loop fastener being complimentary to each other whereby said distal ends are selectively engageable to each other.

6. The convertible chair and walker assembly of claim 1, further comprising:

a locking arm coupled to said frame assembly, said seat assembly including a locking pin, said locking arm being selectively engageable to said locking pin for holding said seat assembly in a tilted position between said upright position and said inverted position, said tilted position being defined by a junction between said seat and said back portion of said seat assembly being positioned below respective distal edges of said seat and said back portion such that said seat and said back portion are adapted for cradling a child positioned in said seat assembly.

7. The convertible chair and walker assembly of claim 6, further comprising:

said seat assembly including a pair of straps, said straps being engageable to each other such that said straps are adapted for securing the child to said seat assembly.

8. The convertible chair and walker assembly of claim 1, further comprising:

said frame assembly including a pair of telescopic handles for facilitating moving of said frame assembly on the supporting surface.

9. The convertible chair and walker assembly of claim 8, further comprising:

a hand brake assembly having a brake handle coupled to one of said telescopic handles, said hand brake assembly including a brake member coupled to said frame assembly for engaging one of said wheels when said brake handle is actuated by a user whereby said one of said wheels is prevented from rotating.

10. The convertible chair and walker assembly of claim 1, further comprising:

said frame assembly being selectively collapsible for facilitating storage of said convertible chair and walker assembly during periods of non-use.

11. The convertible chair and walker assembly of claim 10, further comprising:

said seat including an extension portion, said extension portion including a locking slot;

a distal edge of said back portion being pivotally coupled to said frame assembly, a proximal edge of said back portion including a protrusion for selectively engaging said locking slot whereby said back portion is held in a static position relative to said seat when said protrusion engages said locking slot; and said protrusion being selectively disengageable from said locking slot to permit rotation of said back portion around said frame assembly such that said back portion is positionable in a plane substantially parallel to a plane in which said seat lies for facilitating storage of said convertible chair and walker assembly.

12. The convertible chair and walker assembly of claim 1, further comprising:

a pair of fixed handles coupled to said seat proximate a distal edge of said seat, each of said fixed handles being positioned on an associated side of said seat such that each said fixed handle is adapted for grasping by a respective hand of a user during getting into and out of said seat assembly.

13. The convertible chair and walker assembly of claim 1, further comprising:

a pair of support members, each of said support members being coupled to an associated side of said frame assembly, said support members being positioned such that said support members abut said seat when said seat assembly is in said upright position and said support members abut said back portion when said seat assembly is in said inverted position.

14. The convertible chair and walker assembly of claim 13, further comprising:

a center of gravity of said seat assembly being offset from a pivotal axis of said seat assembly when said seat assembly is in said upright position whereby said seat assembly is urged to rotate around said pivotal axis such that said seat is urged against said support members for holding said seat assembly in said upright position; and said center of gravity of said seat assembly being offset from said pivotal axis of said seat assembly when said seat assembly is in said inverted position whereby said seat assembly is urged to rotate around said pivotal axis such that said back portion is urged against said support members for holding said seat assembly in said inverted position.

15. The convertible chair and walker assembly of claim 1, further comprising:

a pair of side rails, each of said side rails extending between said seat and said back portion.

16. The convertible chair and walker assembly of claim 3, further comprising:

said frame assembly including a pair of lower side members; and said foot rest assembly including a pair of connection arms, each of said connection arms being slidably insertable into an associated one of said lower side members.

17. The convertible chair and walker assembly of claim 1, further comprising:

a basket;

a tray locking member extendably coupled to said bottom surface of said seat, said tray locking member being extendable to engage an aperture in said frame assembly for holding said bottom surface in a generally vertical position;

a plurality of hooks coupled to said bottom surface, said basket being engageable to said hooks for holding said basket when said bottom surface is in said generally vertical position.

18. A convertible chair and walker assembly comprising:

a frame assembly;

a plurality of wheels coupled to said frame assembly whereby said frame assembly is adapted for facilitating moving of said frame assembly on a supporting surface;

a seat assembly pivotally coupled to said frame assembly, said seat assembly having a seat and a back portion, said seat having a generally planar bottom surface;

said seat assembly being pivotable between an upright position and an inverted position, said upright position being defined by said seat facing upwards whereby said seat is adapted for supporting a person sitting in said seat, said inverted position being defined by said seat facing downwardly such that said bottom surface faces up whereby said frame assembly is usable as a walker and said bottom surface having a tray portion is adapted for supporting objects placed on of said bottom surface;

a first basket;

a first plurality of hooks coupled to an outer face of a back portion of said seat assembly, said first basket being couplable to said first plurality of hooks when said seat assembly is in said upright position;

a foot rest assembly slidably engageable to said frame assembly such that said foot rest assembly is adapted for supporting feet of a user seated on said seat when said seat assembly is in said upright position;

said frame assembly including a pair of lower side members;

said foot rest assembly including a pair of connection arms, each of said connection arms being slidably insertable into an associated one of said lower side members;

said seat assembly including a pair of straps, said straps being engageable to each other such that said straps are adapted for selectively securing a user to said seat;

a distal end of each of said straps having an associated portion of hook and loop fastener, said portions of hook and loop fastener being complimentary to each other whereby said distal ends are selectively engageable to each other;

a locking arm coupled to said frame assembly, said seat assembly including a locking pin, said locking arm being selectively engageable to said locking pin for holding said seat assembly in a tilted position between said upright position and said inverted position, said tilted position being defined by a junction between said seat and said back portion of said seat assembly being positioned below respective distal edges of said seat and said back portion such that said seat and said back portion are adapted for cradling a child positioned in said seat assembly;

said frame assembly including a pair of telescopic handles for facilitating moving of said frame assembly on the supporting surface;

a hand brake assembly having a brake handle coupled to one of said telescopic handles, said hand brake assembly including a brake member coupled to said frame assembly for engaging one of said wheels when said brake handle is actuated by a user whereby said one of said wheels is prevented from rotating;

a pair of fixed handles coupled to said seat proximate a distal edge of said seat, each of said fixed handles being positioned on an associated side of said seat such that each said fixed handle is adapted for grasping by a respective hand of a user during getting into and out of said seat assembly;

a pair of support members, each of said support members being coupled to an associated side of said frame assembly, said support members being positioned such that said support members abut said seat when said seat assembly is in said upright position and said support members abut said back portion when said seat assembly is in said inverted position;

a center of gravity of said seat assembly being offset from a pivotal axis of said seat assembly when said seat assembly is in said upright position whereby said seat assembly is urged to rotate around said pivotal axis such that said seat is urged against said support members for holding said seat assembly in said upright position;

said center of gravity of said seat assembly being offset from said pivotal axis of said seat assembly when said seat assembly is in said inverted position whereby said seat assembly is urged to rotate around said pivotal axis such that said back portion is urged against said support members for holding said seat assembly in said inverted position;

a pair of side rails, each of said side rails extending between said seat and said back portion;

a second basket;

a tray locking member extendably coupled to said bottom surface of said seat, said tray locking member being extendable to engage an aperture in said frame assembly for holding said bottom surface in a generally vertical position; and a second plurality of hooks coupled to said bottom surface, said second basket being engageable to said second plurality of hooks for holding said second basket when said bottom surface is in said generally vertical position.

19. A convertible chair and walker assembly comprising:

a frame assembly;

a plurality of wheels coupled to said frame assembly whereby said frame assembly is adapted for facilitating moving of said frame assembly on a supporting surface;

a seat assembly pivotally coupled to said frame assembly, said seat assembly having a seat and a back portion, said seat having a generally planar bottom surface;

said seat assembly being pivotable between an upright position and an inverted position, said upright position being defined by said seat facing upwards whereby said seat is adapted for supporting a person sitting in said seat, said inverted position being defined by said seat facing downwardly such that said bottom surface faces up where by said frame assembly is usable as a walker and said bottom surface having a tray portion is adapted for supporting objects placed on said bottom surface;

a first basket;

a first plurality of hooks coupled to an outer face of a back portion of said seat assembly, said first basket being couplable to said first plurality of hooks when said seat assembly is in said upright position;

a foot rest assembly slidably engageable to said frame assembly such that said foot rest assembly is adapted for supporting feet of a user seated on said seat when said seat assembly is in said upright position;

said frame assembly including a pair of lower side members;

said foot rest assembly including a pair of connection arms, each of said connection arms being slidably insertable into an associated one of said lower side members;

said seat assembly including a pair of straps, said straps being engageable to each other such that said straps are adapted for selectively securing a user to said seat;

a distal end of each of said straps having an associated portion of hook and loop fastener, said portions of hook and loop fastener being complimentary to each other whereby said distal ends are selectively engageable to each other;

said frame assembly including a pair of telescopic handles for facilitating moving of said frame assembly on the supporting surface;

a hand brake assembly having a brake handle coupled to one of said telescopic handles, said hand brake assembly including a brake member coupled to said frame assembly for engaging one of said wheels when said brake handle is actuated by a user whereby said one of said wheels is prevented from rotating;

a pair of fixed handles coupled to said seat proximate a distal edge of said seat, each of said fixed handles being positioned on an associated side of said seat such that each said fixed handle is adapted for grasping by a respective hand of a user during getting into and out of said seat assembly;

said frame assembly being selectively collapsible for facilitating storage of said convertible chair and walker assembly during periods of non-use;

said seat including an extension portion, said extension portion including a locking slot;

a distal edge of said back portion being pivotally coupled to said frame assembly, a proximal edge of said back portion including a protrusion for selectively engaging said locking slot whereby said back portion is held in a static position relative to said seat when said protrusion engages said locking slot;

said protrusion being selectively disengageable from said locking slot to permit rotation of said back portion around said frame assembly such that said back portion is positionable in a plane substantially parallel to a plane in which said seat lies for facilitating storage of said convertible chair and walker assembly;

a second basket;

a tray locking member extendably coupled to said bottom surface of said seat, said tray locking member being extendable to engage an aperture in said frame assembly for holding said bottom surface in a generally vertical position; and a second plurality of hooks coupled to said bottom surface, said second basket being engageable to said second plurality of hooks for holding said second basket when said bottom surface is in said generally vertical position.

* * * * *